Oct. 12, 1965   W. E. BUCK   3,212,100
REVOLUTION VELOCITY DOUBLER
Filed Aug. 12, 1963
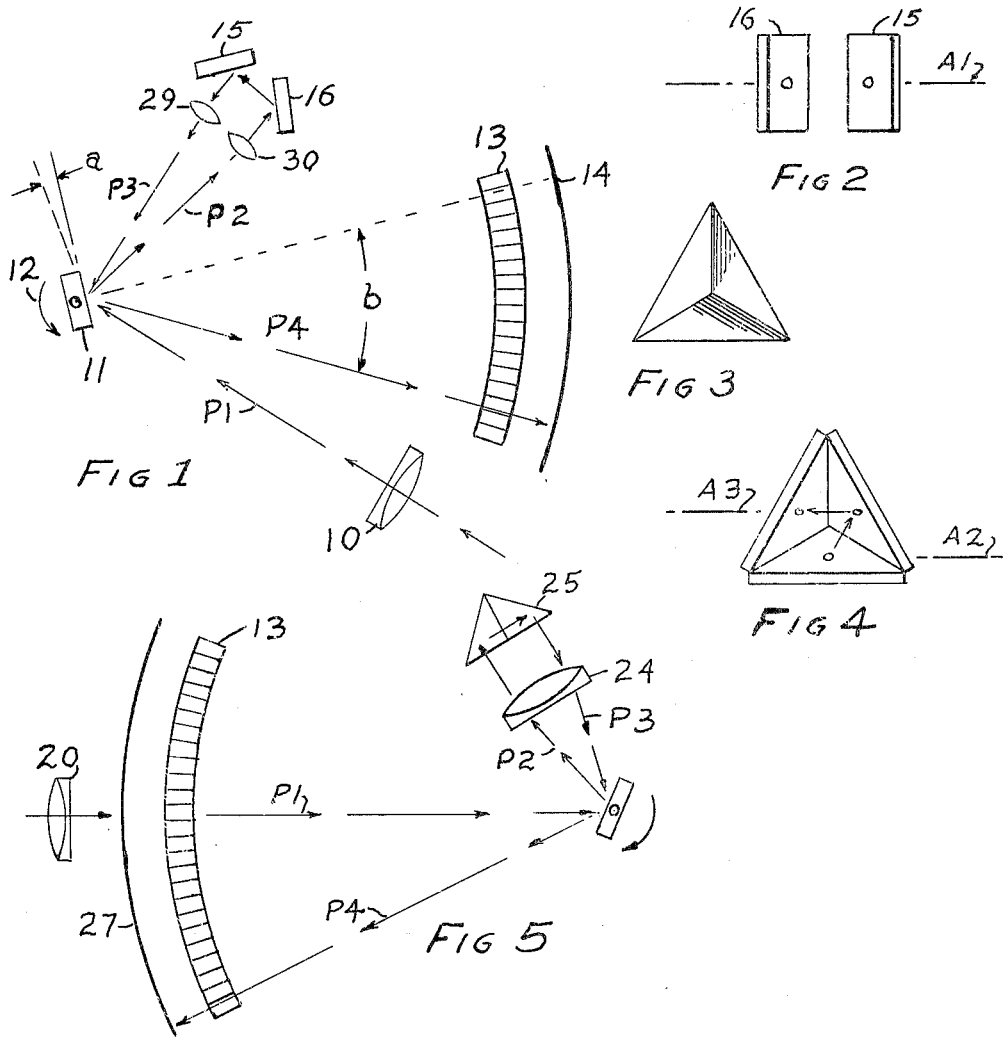
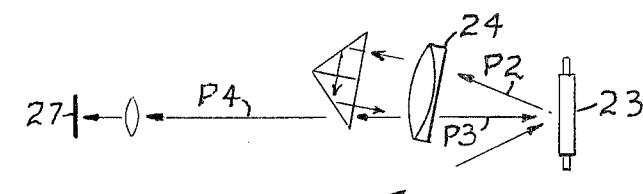
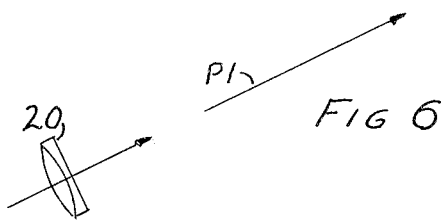
INVENTOR.
WILLARD E. BUCK
BY
*Fryer + Tjensvold*
ATTORNYS

United States Patent Office 3,212,100
Patented Oct. 12, 1965

3,212,100
REVOLUTION VELOCITY DOUBLER
Willard E. Buck, Santa Clara, Calif., assignor to Beckman & Whitley, Inc., San Carlos, Calif., a corporation of Delaware
Filed Aug. 12, 1963, Ser. No. 301,526
5 Claims. (Cl. 352—109)

This invention relates to revolution velocity doublers for use in high speed photography and particularly to improvements in such velocity doublers which give them a wide range of usefulness.

It is well known in high speed photography to employ a rotating mirror to sweep the image of an event to be recorded over a film upon which records are to be produced. The velocity of the light beam or image with respect to the film depends upon the distance of the film from the rotating mirror as well as the angular velocity of the light beam. One type of velocity doubler disclosed herein employs stationary reflecting surfaces used with a rotating mirror and high aperture lenses to increase the angular velocity of a light beam and the data gathering ability of a camera but has practical limitations hereinafter discussed in detail which limit the length of film or number of frame exposures which can be made thereon without reducing the effective size of the rotating mirror. It also presents a serious problem of double exposures.

It is an object of the present invention to provide means for doubling the angular velocity of the beam produced by the rotating mirror of a high speed camera and to provide a velocity doubler for use with a rotating mirror which is capable of exposing as many frames on a length of film as can be exposed by a rotating mirror without a doubler.

Further and more specific objects and advantages of the invention are made apparent in the following specification wherein reference is made to the accompanying drawing.

In the drawing:

FIG. 1 is a diagrammatic illustration showing the principles of operation of a conventional rotating mirror camera with one type of velocity doubler of the present invention;

FIG. 2 is a view looking into the stationary mirrors of the doubler shown in FIG. 1;

FIG. 3 is an elevational view of a geometrical shape known as a tetrahedron;

FIG. 4 is a view looking into a set of three mirrors arranged in the planes of three sides of a tetrahedron such as that shown in FIG. 3;

FIG. 5 is a diagrammatic illustration of the optics of a camera employing a tetrahedronal velocity doubler in accordance with a preferred form of the present invention; and FIG. 6 is a diagrammatic view of the rotating mirror and velocity doubler shown in FIG. 5 as viewed from the bottom of FIG. 5.

The diagrammatic views of the present drawing do not include image stops, field lenses and other optical elements which vary with cameras of different design but attempt only to show the general path of a bundle of light containing an image of an event to be recorded from the objective system of the camera to the film.

In a common form of rotating mirror framing camera, an objective optical system shown at 10 in FIG. 1 projects an image onto a rotating mirror 11 which upon rotation in the direction of the arrow shown at 12 sweeps a beam containing the image across a group of relay lenses 13 which focus a second image of the event onto a film on an arcuate film support which occupies the position shown by the line 14. With the aid of apertured stops (not shown) in the objective and relay systems, framed records of the event are recorded at spaced intervals on the film in a manner well known in the art of high speed photography. It is evident that the speed of framing is determined in part by the angular spacing of the relay lenses and by the angular velocity of the light beam. This angular velocity can be doubled without changing the rotational speed of the mirror which is usually at a maximum speed dictated by the strength to weight ratio of the mirror material. This angular velocity doubling is accomplished by directing the beam of light through a large aperture lens 30 to form a parallel bundle of light that is directed back through a lens 29 by mirrors 15 and 16. Lens 30 forms a second image on the mirror face but the beam forming this image has already achieved an angular velocity from the rotating mirror equal to twice the angular velocity of the mirror from the first reflection. This velocity is in the proper direction to add to the rotational velocity of the mirror so that the second beam coming from the rotating mirror has an angular velocity four times the angular velocity of the mirror. The dotted lines indicate this beam after the mirror has rotated through a small angle "a" and the beam has gone through a larger angle "b" with "b" equalling four times "a".

It should be understood that the actual angle of reflection represented by the paths P1 to P4, inclusive, in FIG. 1 are not accurate but merely illustrative due to the fact that the mirror 11 is constantly rotating.

One deficiency of this system of velocity doubling arises from the fact that all of the paths P1 to P4 lie in a common plane as can be understood from FIG. 2 which is a view looking into the mirrors 15 and 16. Assuming that a pencil of light is swept across these mirrors, it would move in a horizontal plane as represented by the line A1 so that upon striking the center of mirror 15 at the point indicated by the small circle thereon it would be reflected to the center of mirror 16 and back to the rotating mirror 11, all in the same plane. Consequently the beam path P4 of FIG. 1 would also be in this plane as would the beam path P2. Thus upon rotation of mirror 11 in the counterclockwise direction illustrated, the beam path P2 will soon pass the edge of mirror 16 and be imposed through the relay lenses 13 and exposed on the film positioned at 14. Thus the distance between paths P2 and P4 limits the exposure time of the camera and the number of frames which can be exposed without danger of double exposure caused by the slower beam P2. Consequently the beam path P2 can only be used as it crosses lens 29. At other positions, it is either double writing or not recording. The most severe problem is encountered when the beam P2 crosses from lens 30 to lens 29. A shutter must either open or close in this interval of time which is very short to prevent the camera from double exposing. The preferred form of this invention overcomes this danger of double exposure and permits the beam P4 to sweep throughout the full length of the film, limited only by the ability of the rotating mirror to produce a good image, meanwhile directing the beam P2 away from the film. This is accomplished by the use of a tetrahedron type prism or arrangement of mirrors in place of the two right angularly arranged mirrors 15 and 16.

FIG. 3 is a perspective view of a tetrahedron which geometrically is a four sided figure with each side consisting of an isosceles triangle. Three sides meet each other at right angles while the fourth side or base is disposed at 45° to the others. Such geometric configuration when produced in transparent material such as glass or crystal has the characteristic of reflecting light from any direction back toward its source in a different plane. For the purposes of the present invention, a tetrahedronal prism may be employed or alternately three mirrors arranged in the position of three sides of a tetrahedron. Such an arrangement of mirrors is illustrated in FIG. 4 which is a view looking into the center of three mirrors so arranged. Assuming that a pencil of light entering the tetrahedron on an axis normal to the plane of the paper and sweeping across the lower mirror surface on the plane A2 is in the position of the circle on said surface, it will be reflected to the right hand mirror and then to the left hand mirror as indicated by arrows and will be reflected by the left hand mirror back toward its source in the plane A3. Thus referring back to FIG. 1, it is seen that by substituting a tetrahedronal reflector for mirrors 15 and 16 the planes of the beams P2 and P4 can be separated so that the beam P4 may be swept across the film upon rotation of the mirror 11 without danger of the beam P2 also impinging and exposing the film.

A typical arrangement of one type of camera employing such a tetrahedronal velocity doubler is shown in FIGS. 5 and 6 with an objective system shown at 20 projecting a beam P1 to a rotating mirror 23. The rotating mirror sweeps the beam P2 through a single large aperture lens 24 and to a tetrahedronal reflector 25 which returns the beam along the path P3 again to be reflected by the rotating mirror along the path P4 through relay lenses 13 and onto an arcuate film support shown at 27.

FIG. 6 illustrates the mirror 23 and reflector 25 as viewed from the bottom of FIG. 5 and shows that the path P2 is directed upwardly while the path P3 will be reflected downwardly from the mirror 23 thus avoiding double exposure of the film toward which the reflected beam P4 is directed. The tetrahedron reflector is shown in FIG. 6 as canted or tilted away from the plane parallel to the plane of the axis of the rotating mirror illustrating the ability to vary the direction of the beam P4 in accordance with the particular optical system and arrangement of components of a camera with which it is used.

It is because the incoming beam P1 approaches the rotating mirror at an angle to its axis as shown in FIG. 6 that a reflected beam only reaches the surface of the film at 27 when it is directed back into the plane of the film by the tetrahedron 25. The beam P2 reflected by the rotating mirror is directed away from the film plane and is effective to expose the film only while it crosses the lens 24 which directs it to the tetrahedron. Thus the rotating mirror can make nearly a complete revolution before beam P2 returns to the lens 24 where it could produce a double exposure providing plenty of time for shuttering mechanism to act.

While FIGS. 5 and 6 represent the present invention in the form using a corner prism or tetrahedron for use in certain types of cameras, FIG. 1 of the drawings also represents a complete embodiment of the invention and as will be obvious from the disclosure, the reflecting surfaces illustrated in the form of first surface mirrors 15 and 16 could as well be a triangular prism with angularly related mirror surfaces. It is essential however to obtain the doubling effect that the line of intersection of the planes of the two mirror surfaces be parallel to the axis of rotation of the rotating mirror 11 in order that the beam P3 be given a sweeping motion in the direction that is necessary for the motion to be added to the velocity of the mirror. This produces the doubling effect whether the invention is employed in a camera or any other device. Furthermore the lenses 29 and 30 are disposed between the rotating mirror and the mirrors 15 and 16 only when the doubler is combined with certain types of camera optics. These lenses are, however, not necessary to the doubling effect and may be found in entirely different positions in the optical train of a different type of camera. The revolution doubler is effectively used without any lenses in devices where a pencil of light or a laser beam is reflected by a rotating mirror.

I claim:

1. Means to double the angular velocity of a beam of light reflected by a rotating mirror which comprises a tetrahedronal reflector in the path of said beam and in a position to reflect the beam back to the mirror and a large aperture lens interposed between the rotating mirror and the tetrahedronal reflector.

2. The combination of claim 1 in a camera having a film support in a plane normal to the axis of the mirror, means to direct the beam toward the mirror on an angularly related axis, then to the tetrahedron, back to the mirror, and to the film support on said plane.

3. A rotating mirror camera comprising a film support on a plane normal to the axis of rotation of its mirror, an objective system for directing a beam of light containing an image toward the mirror at an angle to one side of said plane whereby it will be reflected at an angle to the opposite side of said plane, and a tetrahedronal reflector intercepting the beam reflected by the mirror and directing it back to the mirror to be again reflected at higher angular velocity toward said film support.

4. The combination of claim 3 with a wide aperture lens intercepting the beam between the mirror and the tetrahedron.

5. Means to double the angular velocity of a beam of light reflected by a rotating mirror comprising two angularly related reflecting surfaces in the path of said beam in positions to reflect the beam back to the mirror, said reflecting surfaces being on planes which intersect at a line parallel to the axis of rotation of the mirror.

References Cited by the Examiner

UNITED STATES PATENTS

| | | | |
|---|---|---|---|
| 1,154,835 | 9/15 | Bauersfeld | 352—105 |
| 3,057,252 | 10/62 | Coburn | 352—84 |
| 3,135,155 | 6/64 | Jacobs | 352—84 |

JULIA E. COINER, *Primary Examiner.*